US012636978B2

(12) United States Patent
Bok et al.

(10) Patent No.: US 12,636,978 B2
(45) Date of Patent: May 26, 2026

(54) WALK-IN DEVICE FOR VEHICLE SEAT

(71) Applicant: Hyundai Transys Inc., Seosan-si (KR)

(72) Inventors: Gwon Hwa Bok, Hwaseong-si (KR);
Hwa Young Mun, Hwaseong-si (KR);
Seong Jun Shin, Hwaseong-si (KR);
Cheolhwan Yoon, Hwaseong-si (KR);
Han Yun Choi, Hwaseong-si (KR);
Junsik Hwang, Hwaseong-si (KR)

(73) Assignee: Hyundai Transys Inc., Seosan-si (KR)

( * ) Notice: Subject to any disclaimer, the term of this
patent is extended or adjusted under 35
U.S.C. 154(b) by 168 days.

(21) Appl. No.: 18/819,721

(22) Filed: Aug. 29, 2024

(65) Prior Publication Data

US 2025/0083577 A1 Mar. 13, 2025

(30) Foreign Application Priority Data

Sep. 13, 2023 (KR) ........................ 10-2023-0121783

(51) Int. Cl.
B60N 2/04 (2006.01)
B60N 2/12 (2006.01)
B60N 2/90 (2018.01)

(52) U.S. Cl.
CPC .............. B60N 2/12 (2013.01); B60N 2/929
(2018.02); B60N 2002/952 (2018.02)

(58) Field of Classification Search
CPC .......... B60N 2/12; B60N 2/123; B60N 2/206;
B60N 2/3065
USPC ................. 297/378.1, 378.12, 341, 331, 334
See application file for complete search history.

(56) References Cited

U.S. PATENT DOCUMENTS

| | | | | | |
|---|---|---|---|---|---|
| 4,634,180 | A | * | 1/1987 | Zaveri .................... | B60N 2/123 |
| | | | | | 297/367 R |
| 6,139,104 | A | * | 10/2000 | Brewer .................... | B60N 2/20 |
| | | | | | 297/367 R |
| 7,025,419 | B2 | * | 4/2006 | Sasaki .................. | B60N 2/0825 |
| | | | | | 297/378.12 |
| 8,047,610 | B2 | * | 11/2011 | Yamagishi ........... | B60N 2/3065 |
| | | | | | 297/341 |
| 8,801,101 | B2 | * | 8/2014 | Dagcioglu ............. | B60N 2/309 |
| | | | | | 296/65.09 |
| 9,290,116 | B2 | * | 3/2016 | Teufel ...................... | B60N 2/12 |
| 9,789,789 | B2 | * | 10/2017 | Akutsu ................... | B60N 2/43 |
| 10,308,146 | B1 | * | 6/2019 | Kish ...................... | B60N 2/045 |
| 10,618,444 | B2 | * | 4/2020 | Kish .................... | B60N 2/1615 |
| 11,400,836 | B2 | * | 8/2022 | Epaud .................... | B60N 2/943 |
| 11,505,101 | B2 | * | 11/2022 | Baranowski ........... | B60N 2/859 |
| 12,459,405 | B2 | * | 11/2025 | Mathew ............... | B60N 2/1615 |
| 2004/0262969 | A1 | * | 12/2004 | Sasaki .................. | B60N 2/0705 |
| | | | | | 297/378.12 |

(Continued)

FOREIGN PATENT DOCUMENTS

| | | |
|---|---|---|
| KR | 10-2446336 B1 | 9/2022 |
| KR | 10-2446337 B1 | 9/2022 |

(Continued)

*Primary Examiner* — Shin H Kim
(74) *Attorney, Agent, or Firm* — Bridgeway IP Law
Group, PLLC; Jihun Kim

(57) ABSTRACT

A walk-in device for a vehicle seat includes a rear link
having one end connected to a seat cushion frame by a first
hinge shaft, and the other end connected to an upper rail by
a second hinge shaft, and a pressing bracket configured to be
pressed by the rear link.

10 Claims, 7 Drawing Sheets

(56)                References Cited

U.S. PATENT DOCUMENTS

| | | | | |
|---|---|---|---|---|
| 2009/0167068 A1* | 7/2009 | Yamagishi | ............... | B60N 2/12 |
| | | | | 297/340 |
| 2010/0052390 A1* | 3/2010 | Dagcioglu | ........... | B60N 2/3093 |
| | | | | 297/324 |
| 2013/0320736 A1* | 12/2013 | Teufel | ................. | B60N 2/3013 |
| | | | | 297/383 |
| 2016/0144748 A1* | 5/2016 | Akutsu | .................... | B60N 2/43 |
| | | | | 297/341 |
| 2017/0313215 A1* | 11/2017 | Akutsu | ................ | B60N 2/3047 |
| 2020/0108739 A1* | 4/2020 | Veine | .................... | B60N 2/3011 |
| 2021/0221269 A1* | 7/2021 | Baranowski | ............. | B60N 2/76 |
| 2024/0067058 A1* | 2/2024 | Mathew | ................. | B60N 2/164 |

FOREIGN PATENT DOCUMENTS

| | | |
|---|---|---|
| KR | 10-2022-0143298 A | 10/2022 |
| KR | 10-2023-0064716 A | 5/2023 |

* cited by examiner

WALK-IN DEVICE FOR VEHICLE SEAT

CROSS-REFERENCE TO RELATED APPLICATIONS

This application claims priority to and the benefit of Korean Patent Application No. 10-2023-0121783 filed in the Korean Intellectual Property Office on Sep. 13, 2023, the entire contents of which are incorporated herein by reference.

TECHNICAL FIELD

The present invention relates to a walk-in device for a vehicle seat.

BACKGROUND ART

In general, a walk-in device for a vehicle seat, which is capable of performing a walk-in function, may be mounted in a front seat of a recreational vehicle (RV) or a three-door vehicle to allow a rear seat passenger to get in or out of the vehicle.

The walk-in function refers to a function of folding a seatback of the front seat forward at a predetermined angle and simultaneously sliding the front seat forward by a predetermined distance when the rear seat passenger operates a walk-in switch of the front seat. When a space between the front seat and the rear seat is ensured by the walk-in function, a passenger seated in the rear seat may get out of the vehicle or a passenger, who is outside the vehicle, may get into the rear seat.

In the case of the walk-in device for a vehicle seat in the related art, a rear link may be unrestrained when the passenger operates the walk-in switch.

When the rear link is restrained, the rear link elastically supported by an elastic member may be rotated by an elastic restoring force of the elastic member, and the rear link may press a locking pin while rotating. When the locking pin is pressed, the locking pin may be unlocked. Therefore, an upper rail may move along a lower rail.

However, in the case of the walk-in device for a vehicle seat in the related art, the locking pin is not completely unlocked by being pressed by a pressing bracket when the rear link operates. For this reason, the upper rail cannot smoothly move along the lower rail, or frictional noise is caused by friction between components.

DOCUMENTS OF RELATED ART

Patent Documents (Patent Document 1) Korean Patent No. 10-2446336 (published on Sep. 22, 2022)
(Patent Document 2) Korean Patent Application Laid-Open No. 10-2022-0143298 (published on Oct. 25, 2022)

SUMMARY OF THE INVENTION

The present invention has been made in an effort to solve the above-mentioned problem, and an object of the present invention is to provide a walk-in device for a vehicle seat, in which a pressing bracket, which is pressed by an end and an outer-diameter portion of a pressing end portion provided on a rear link, presses a locking pin, such that the locking pin may be completely pressed.

In order to achieve the above-mentioned object, the present invention provides a walk-in device for a vehicle seat, the walk-in device including: a rear link having one end connected to a seat cushion frame by a first hinge shaft, and the other end connected to an upper rail by a second hinge shaft; and a pressing bracket configured to be pressed by the rear link, in which a pressing end portion provided at the other end of the rear link rotates about the second rotary shaft in a state in which the pressing end portion is externally in contact with a tip of the pressing bracket, an end and an outer-diameter portion of the pressing end portion sequentially press the tip of the pressing bracket, and a pressing force of the pressing bracket is applied to a locking pin, such that the upper rail and a lower rail locked by the locking pin is unlocked.

In addition, an upper end of the locking pin may penetrate an upper portion of the upper rail and be exposed, and when the upper end of the locking pin is pressed downward by the pressing bracket, a locking plate provided below the locking pin may depart from a locking groove of the lower rail, such that a locked state is released.

In addition, the tip of the pressing bracket may be bent downward so that the tip of the pressing bracket is externally in contact with the end and the outer-diameter portion of the pressing end portion.

In addition, when the outer-diameter portion of the pressing end portion presses the pressing bracket in a state in which the rear link stands upright, a maximum pressing state of the locking pin may be implemented, and a completely unlocked state of the locking pin may be implemented.

In addition, the pressing end portion and the locking pin may be positioned on upper and lower portions of the pressing bracket.

In addition, the rear link may be elastically supported by a first elastic member, the pressing bracket may have an external contact groove, the external contact groove may be assembled to be externally in contact with an outer-diameter portion of a walk-in pipe connected to the upper rail, and the pressing bracket may be elastically supported by an elastic member coupled to the walk-in pipe.

In addition, a gear portion may be provided on an outer-diameter portion of one end of the rear link, a restrained state of the rear link may be implemented when a restraint gear of a restraint device engages with the gear portion, the restrained state of the rear link may be released when the gear portion and the restraint gear are disengaged, and the rear link may be rotatable by the first elastic member that elastically supports the rear link in an unrestrained state.

In addition, a front link may be provided at an interval from the rear link, one end of the front link may be connected to the seat cushion frame, and the other end of the front link may be connected to the upper rail.

In addition, the tip of the pressing bracket may be exposed while passing through a through-window of the upper rail so that the pressing end portion is pressed.

In addition, a portion of the locking pin, which is positioned in the upper rail, may be elastically supported by a second elastic member, the second elastic member may be compressed by the locking pin that moves downward by being pressed by the pressing bracket, and the second elastic member may return the locking pin to an original position while being stretched when a pressing force applied to the locking pin is eliminated.

According to the present invention, the pressing bracket, which is pressed by the end and the outer-diameter portion of the pressing end portion provided on the rear link, presses the locking pin, such that the locking pin may be completely pressed.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
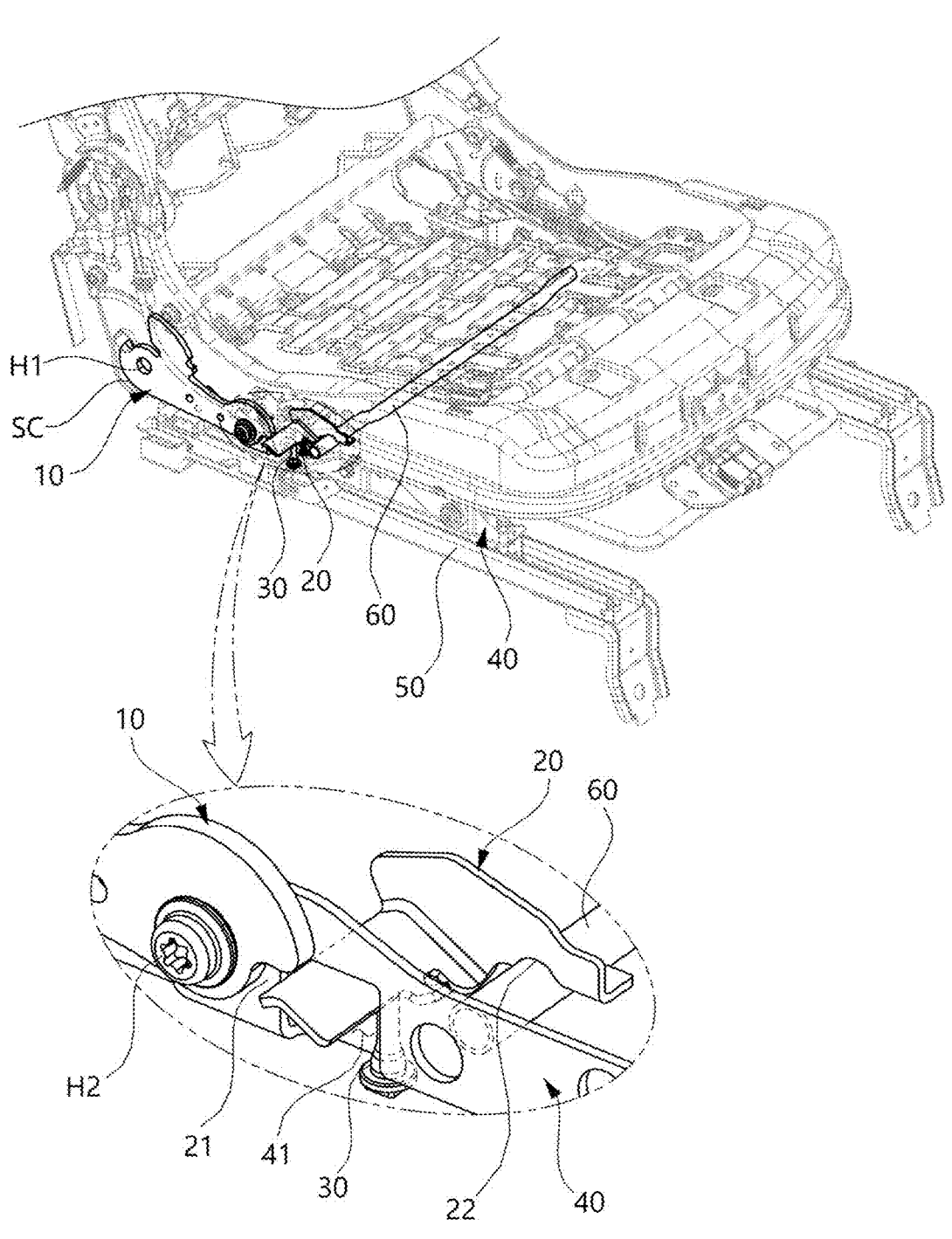
FIG. 1 is a perspective view of a walk-in device for a vehicle seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
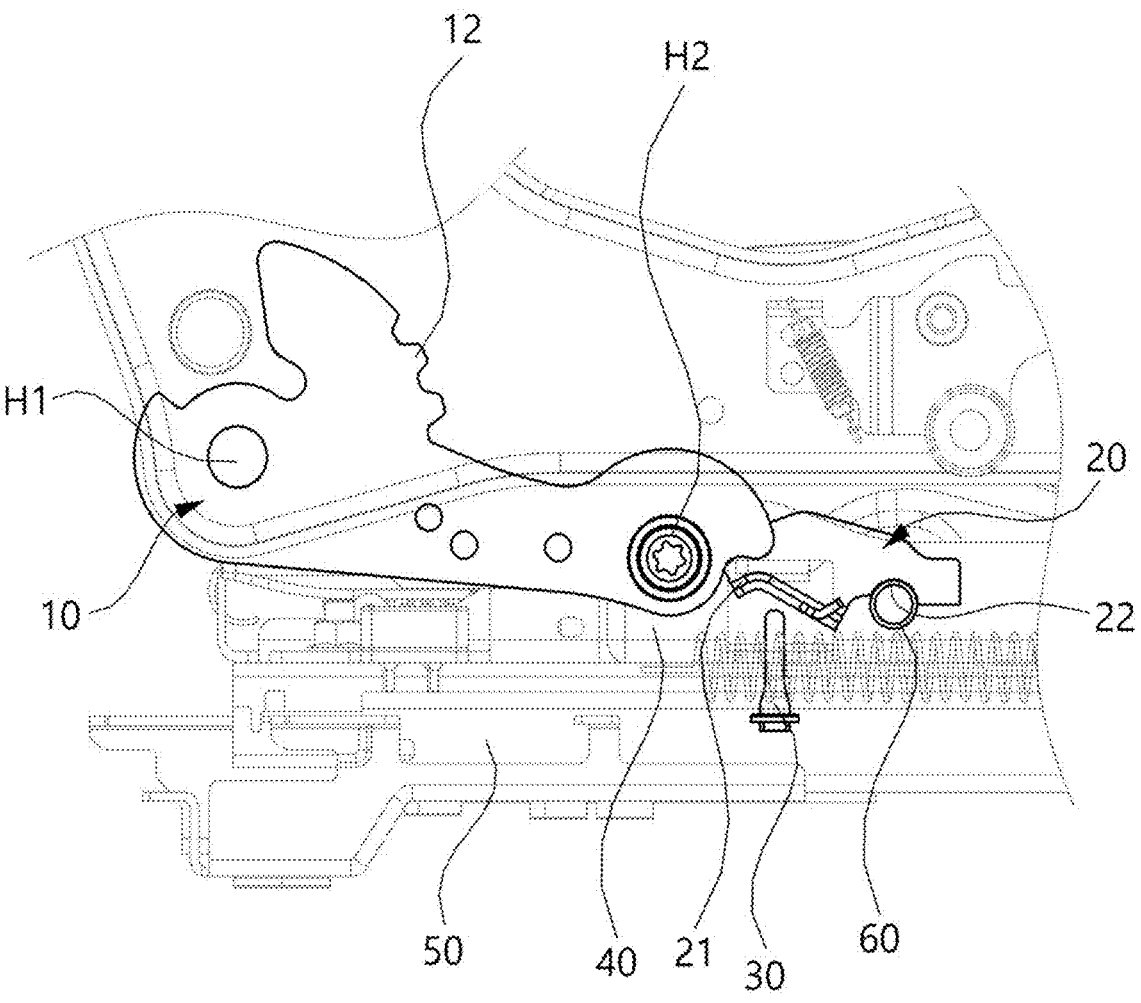
FIG. 2 is a side view of the walk-in device for a vehicle seat according to the exemplary embodiment of the present invention.

FIG. 1 is a perspective view of a walk-in device for a vehicle seat according to an exemplary embodiment of the present invention, and FIG. 2 is a side view of the walk-in device for a vehicle seat according to the exemplary embodiment of the present invention.

As illustrated in FIGS. 1 and 2, the present invention may include a pressing bracket 20 configured to press a rear link 10, a front link 80, and a locking pin 30.

One end of the rear link 10 may be rotatably connected to a seat cushion frame SC by a first hinge shaft H1. The other end of the rear link 10 may be rotatably connected to an upper rail 40 by a second hinge shaft H2.

The pressing bracket 20 may press the locking pin 30 from above the locking pin 30 when the rear link 10 presses the pressing bracket 20. An unlocked state may be implemented as the locking pin 30 is pressed.

A pressing end portion 11 may be provided at the other end of the rear link 10. The pressing end portion 11 may include an end 111 and an outer-diameter portion 112.

The end 111 of the pressing end portion 11 may protrude toward a tip 21 of the pressing bracket 20 so that the end 111 of the pressing end portion 11 may be externally in contact with the tip 21 of the pressing bracket 20.

The outer-diameter portion 112 of the pressing end portion 11 may be configured as a curved surface so that the outer-diameter portion 112 may be externally in contact with the tip 21 of the pressing bracket 20.

The rear link 10 may rotate about a second rotary shaft H2 in a state in which the end 111 of the pressing end portion 11 is externally in contact with the tip 21 of the pressing bracket 20.

When the end 111 and the outer-diameter portion 112 of the pressing end portion 11 sequentially press the tip 21 of the pressing bracket 20, a pressing force of the pressing bracket 20 may be applied to an upper end of the locking pin 30.

When the pressing force of the pressing bracket 20 is applied to the upper end of the locking pin 30, a lower rail 50 and the upper rail 40 may be unlocked by the locking pin 30.

The upper end of the locking pin 30 may penetrate an upper portion of the upper rail 40 and be exposed. The locked state may be released when the pressing bracket 20 presses the upper end of the locking pin 30 downward.

The pressing end portion 11 may be positioned on an upper portion of the pressing bracket 20. The upper end of the locking pin 30 may be positioned on a lower portion of the pressing bracket 20.

The tip 21 of the pressing bracket 20 may be bent downward so that the tip 21 of the pressing bracket 20 may be externally in contact with the end 111 and the outer-diameter portion 112 of the pressing end portion 11.

The front link 80 may be positioned forward of the rear link 10 at an interval from the rear link 10. One end of the front link 80 may be rotatably connected to the seat cushion frame SC. The other end of the front link 80 may be rotatably connected to the upper rail 40.

The tip 21 of the pressing bracket 20 may be exposed through a through-window 41 of the upper rail 40 so that the pressing end portion 11 may be pressed.

Next, an operation of the rear link of the present invention will be specifically described.

Figure 3:
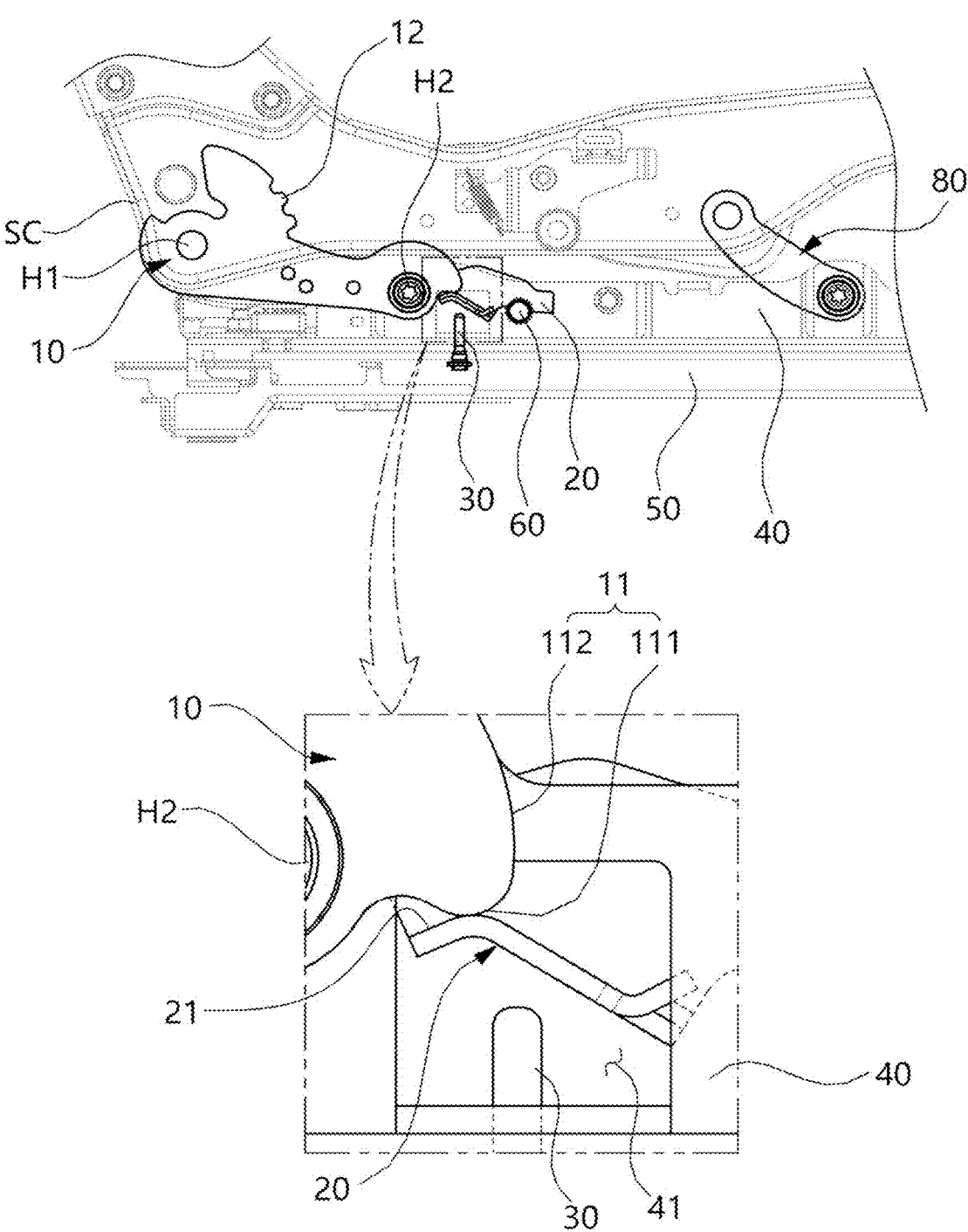
FIG. 3 is a view illustrating a state made before a rear link according to the exemplary embodiment of the present invention operates.

FIG. 3 is a view illustrating a state made before the rear link according to the exemplary embodiment of the present invention operates.

As illustrated in FIG. 3, before the operation of the rear link 10, the end 111 of the pressing end portion 11 may be externally in contact with the tip 21 of the pressing bracket 20. In this case, the rear link 10 and the front link 80 are in a lying state.

Meanwhile, one end of the rear link 10 may be restrained by a restraint device 70 that is a publicly-known component.

Figure 4:
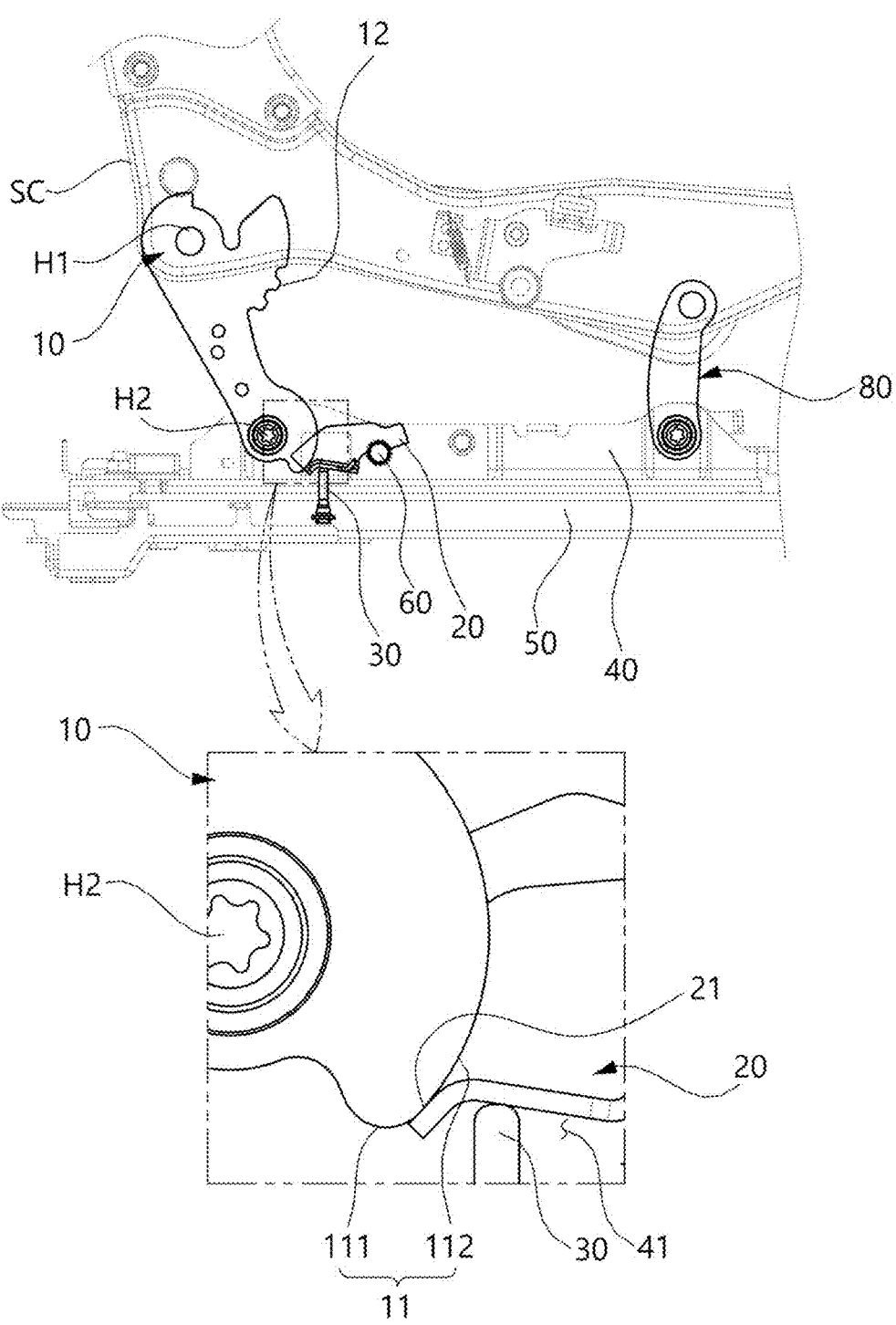
FIG. 4 is a view illustrating a first stage rotation state of the rear link according to the exemplary embodiment of the present invention.

FIG. 4 is a view illustrating a first stage rotation state of the rear link according to the exemplary embodiment of the present invention.

As illustrated in FIG. 4, when one end of the rear link 10 is unrestrained by the operation of the restraint device 70, such that the rear link 10 may rotate about the second hinge shaft H2 at a first stage and stand upright. In this case, the end 111 of the pressing end portion 11 may press the tip 21 of the pressing bracket 20 downward in the state in which the end 111 of the pressing end portion 11 is externally in contact with the tip 21 of the pressing bracket 20.

When the tip 21 of the pressing bracket 20 is pressed downward, the pressing bracket 20 may press the upper end of the locking pin 30.

Figure 5:
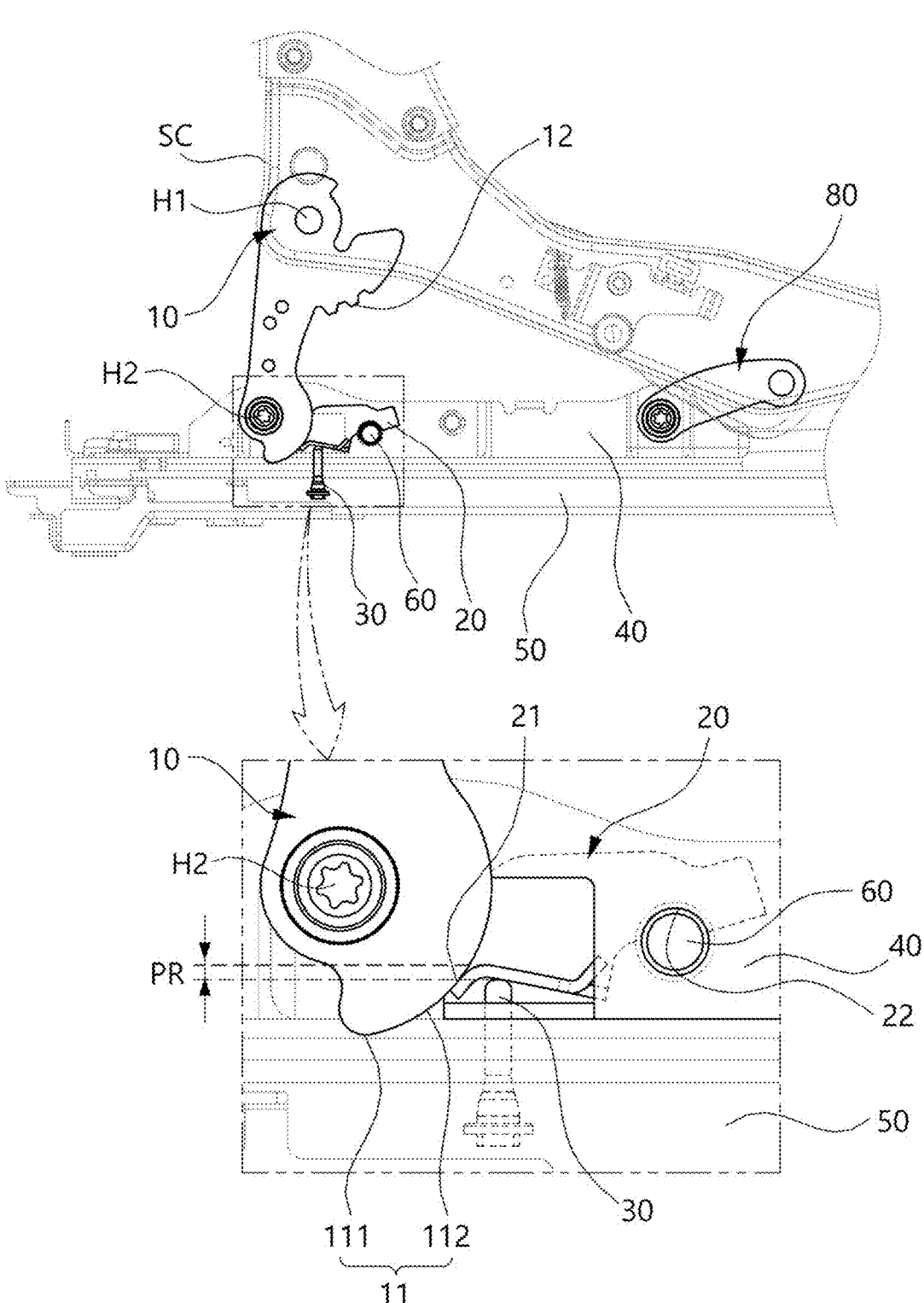
FIG. 5 is a view illustrating a second stage rotation state of the rear link according to the exemplary embodiment of the present invention.

FIG. 5 is a view illustrating a second stage rotation state of the rear link according to the exemplary embodiment of the present invention.

As illustrated in FIG. 5, the rear link 10 may further rotate about the second hinge shaft H2 at a second stage from the first stage.

The outer-diameter portion 112 of the pressing end portion 11 may press the pressing bracket 20 in the state in which the rear link 10 rotates about the second hinge shaft H2 at the second stage and the rear link 10 stands upright.

In the state in which the rear link 10 rotates at the second stage and the rear link 10 stands upright, maximum pressing PR of the locking pin 30 may be performed when the pressing bracket 20 is pressed by the outer-diameter portion 112 of the pressing end portion 11. When the pressing bracket 20 is pressed, the locking pin 30 may move downward, such that the locking pin 30 may be completely unlocked.

Meanwhile, for ease of understanding, the rotational operation of the rear link 10 has been described as being divided into the first and second stages. However, because the rotation of the rear link 10 is performed continuously and instantaneously, the rotational operation of the rear link 10 cannot actually be divided into the first and second stages.

Next, an operation of the restraint device will be described specifically.

Figure 6:
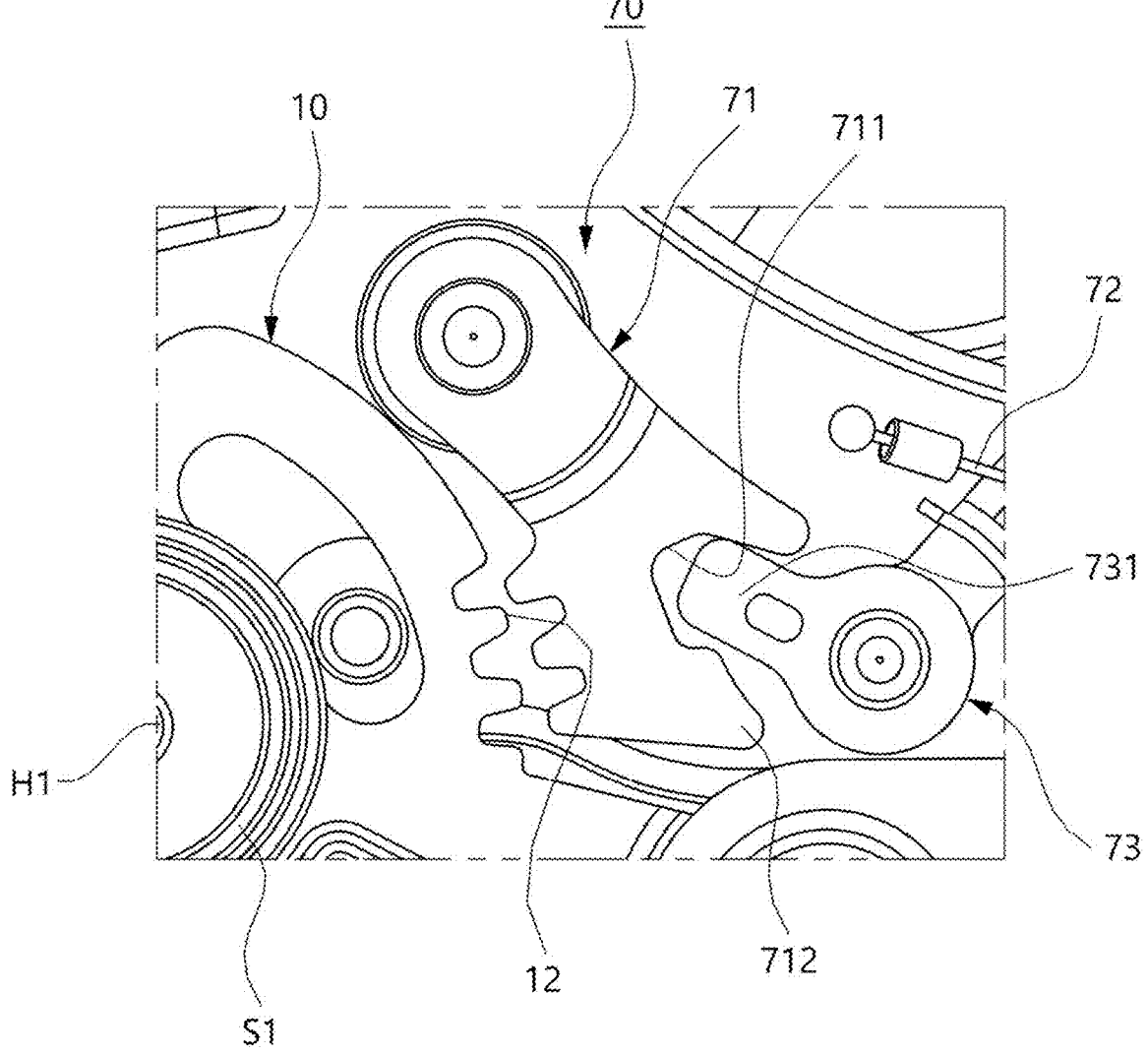
FIG. 6 is a view illustrating a restraint device according to the exemplary embodiment of the present invention.

FIG. 6 is a view illustrating the restraint device according to the exemplary embodiment of the present invention.

As illustrated in FIG. 6, the restraint device 70 may include a restraint gear 71 configured to engage with a gear portion 12 provided at one end of the rear link 10, a locking lever 73 having a locking portion 731 inserted into a restraint release groove 711 of the restraint gear 71, and a cable 72 connected to the locking lever 73.

In a restrained state, the locking portion 731 of the locking lever 73 presses a restraint protrusion 712 of the restraint gear 71, such that the restraint gear 71 may engage with the gear portion 12 of the rear link 10.

For example, when a passenger operates a walk-in switch (not illustrated), the cable 72 may be pulled by an operation of a drive device (not illustrated) such as an actuator, and the locking lever 73 connected to the cable 72 may rotate in a restraint release direction.

When the locking lever 73 rotates axially, the locking portion 731 of the locking lever 73, which presses the restraint protrusion 712, may be inserted into the restraint release groove 711 of the restraint gear 71.

The restraint gear 71 may rotate in an unlocking direction as the locking portion 731 is inserted into the restraint release groove 711 of the restraint gear 71. Therefore, the restraint gear 71 and the gear portion 12 of the rear link 10 may be disengaged.

One end of the rear link 10 may be unrestrained as the restraint gear 71 and the gear portion 12 of the rear link 10 are disengaged.

Next, an operation of unlocking the locking pin will be described specifically.

Figure 7:
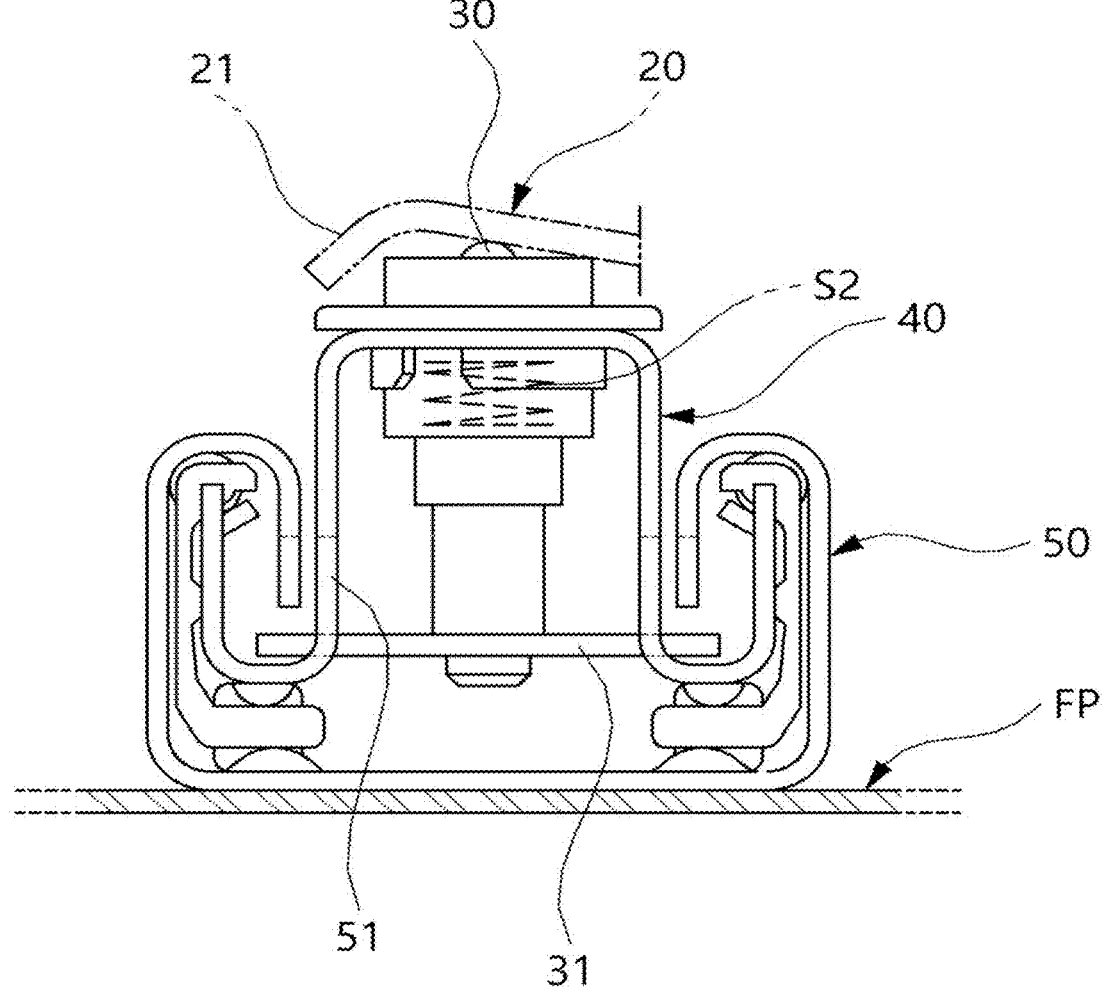
FIG. 7 is a view illustrating an unlocked state of a locking pin according to the exemplary embodiment of the present invention.

FIG. 7 is a view illustrating an unlocked state of a locking pin according to the exemplary embodiment of the present invention.

As illustrated in FIG. 7, when the rear link 10 is unrestrained, the rear link 10 may be rotated by a restoring force of a first elastic member S1 that elastically supports the rear link 10. For example, the first elastic member S1 may be a spiral spring.

The end 111 and the outer-diameter portion 112 of the pressing end portion 11 of the rear link 10 may sequentially press the tip 21 of the pressing bracket 20 by the rotational operation of the rear link 10. The locked state of the locking pin 30 may be released as the pressing bracket 20 presses the upper end of the locking pin 30 in conjunction with the above-mentioned operation.

The pressing bracket 20 may have an external contact groove 22. The external contact groove 22 may be externally in contact with an outer-diameter portion of a walk-in pipe 60. The external contact groove 22 may be assembled to be rotatable about the walk-in pipe 60. The walk-in pipe 60 may be connected to the upper rail 40.

The pressing bracket 20 may be elastically supported by an elastic member (not illustrated) such as a torsion spring coupled to the walk-in pipe 60.

Specifically, when the locking pin 30 is pressed by the pressing bracket 20 in a locked state in which a locking plate 31 provided below the locking pin 30 is inserted into a locking groove 51 of the lower rail 50, the locking pin 30 may move downward, and the locking plate 31 may completely depart from the locking groove 51. Therefore, the locking pin 30 may be unlocked.

When the locking pin 30 is unlocked, the upper rail 40 may freely move along the lower rail 50.

A portion of the locking pin 30, which is positioned in the upper rail 40, may be elastically supported by a second elastic member S2. The second elastic member S2 may be compressed when the locking pin 30 is operated downward by being pressed by the pressing bracket 20. The second elastic member S2 in the compressed state may be stretched when the pressing force applied to the locking pin 30 is eliminated, and the second elastic member S2 may push the locking pin 30 upward and return the locking pin 30 to an original position.

The lower rail 50 may be connected to a floor panel FP in the vehicle. The upper rail 40 may be connected to the seat cushion frame SC while being assembled so that the upper rail 40 may move along the lower rail 50.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A walk-in device for a vehicle seat, the walk-in device comprising:
a rear link having one end connected to a seat cushion frame by a first hinge shaft, and another end connected to an upper rail by a second hinge shaft; and
a pressing bracket configured to be pressed by the rear link,
wherein a pressing end portion defined at the another end of the rear link is configured to rotate about the second hinge shaft in a state in which the pressing end portion is externally in contact with a tip of the pressing bracket, and
wherein an end and an outer-diameter portion of the pressing end portion are configured to sequentially press the tip of the pressing bracket to apply a pressing force of the pressing bracket to a locking pin to unlock the upper rail and a lower rail locked by the locking pin.

2. The walk-in device of claim 1,
wherein an upper end of the locking pin is configured to penetrate an upper portion of the upper rail and be exposed to the pressing bracket, and
wherein when the upper end of the locking pin is pressed downward by the pressing bracket, a locking plate disposed below the locking pin is configured to depart from a locking groove of the lower rail to release a locked state.

3. The walk-in device of claim 1,
wherein the tip of the pressing bracket is bent downward to be externally in contact with the end and the outer-diameter portion of the pressing end portion.

4. The walk-in device of claim 1,
wherein when the outer-diameter portion of the pressing end portion presses the pressing bracket in a state in which the rear link stands upright, the walk-in device is configured to implement a maximally pressed state of the locking pin to implement a completely unlocked state of the locking pin.

5. The walk-in device of claim 1,
wherein the pressing end portion and the locking pin are positioned on upper and lower portions of the pressing bracket, respectively.

6. The walk-in device of claim 1,
wherein the rear link is elastically supported by a first elastic member, the pressing bracket has an external contact groove, the external contact groove is externally in contact with an outer-diameter portion of a walk-in pipe connected to the upper rail, and the pressing bracket is elastically supported by an elastic member coupled to the walk-in pipe.

7. The walk-in device of claim 1,
wherein a gear portion is defined on an outer-diameter portion of the one end of the rear link,
wherein the walk-in device further comprises a restraint device having a restraint gear,
wherein the restraint gear of the restraint device is configured to implement a restrained state of the rear link when the restraint gear of the restraint device engages with the gear portion,
wherein the restraint gear is configured to release the restrained state of the rear link when the gear portion and the restraint gear are disengaged, and
wherein the rear link is rotatable by a first elastic member that elastically supports the rear link in an unrestrained state.

8. The walk-in device of claim 1,
wherein a front link is disposed at an interval from the rear link, one end of the front link is connected to the seat cushion frame, and another end of the front link is connected to the upper rail.

9. The walk-in device of claim 1,
wherein the tip of the pressing bracket is exposed to the pressing end portion while passing through a through-window of the upper rail to enable pressing by the pressing end portion.

10. The walk-in device of claim 1,
wherein a portion of the locking pin, which is positioned in the upper rail, is elastically supported by a second elastic member, the second elastic member is configured to be compressed by the locking pin when the locking pin moves downward by being pressed by the pressing bracket, and the second elastic member is configured to return the locking pin to an original position while being stretched when a pressing force applied to the locking pin is eliminated.

* * * * *